July 18, 1961 W. N. CARROLL 2,993,128
TRANSISTOR PROTECTIVE CIRCUIT
Filed Dec. 26, 1957
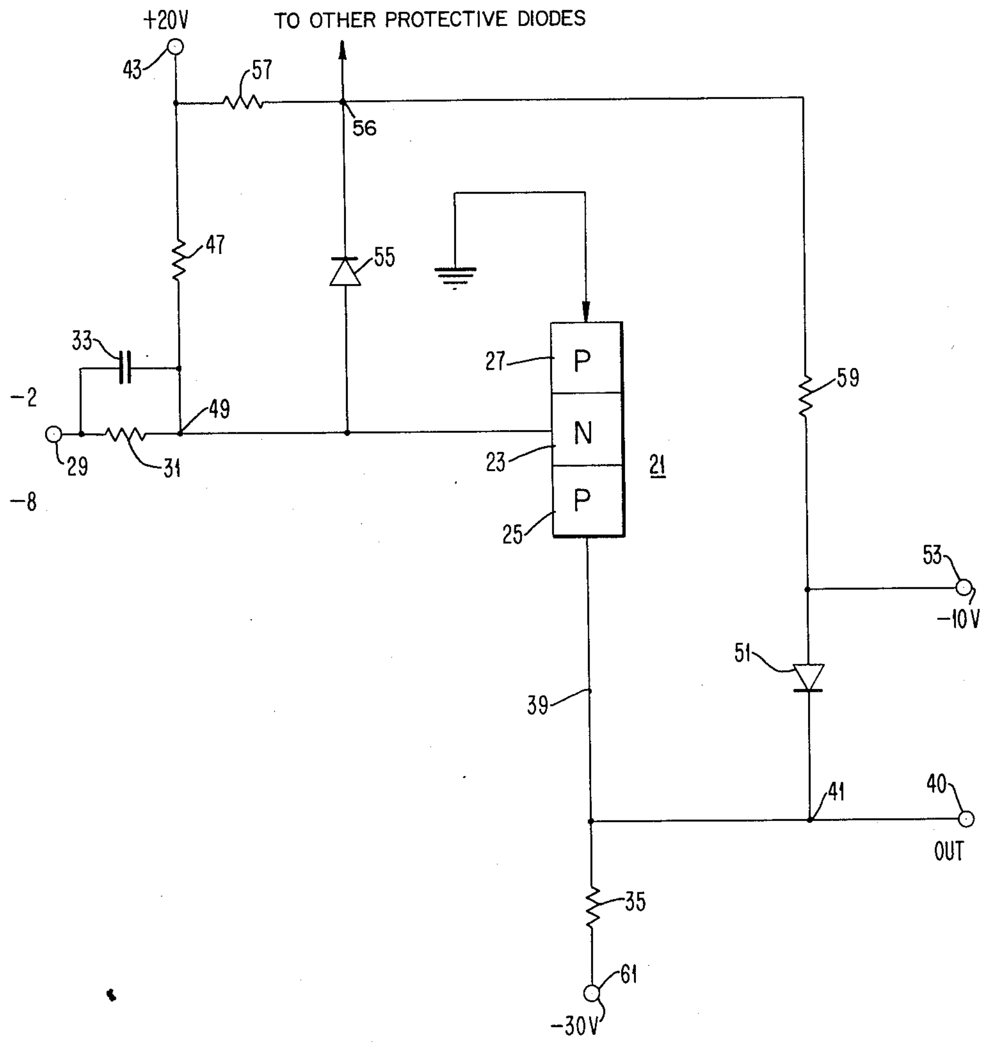
INVENTOR.
WILLIAM N. CARROLL
BY Joseph J. Connerton
ATTORNEY United States Patent Office 2,993,128

Patented July 18, 1961

2,993,128

TRANSISTOR PROTECTIVE CIRCUIT

'illiam N. Carroll, Wappingers Falls, N.Y., assignor to International Business Machines Corporation, New York, N.Y., a corporation of New York Filed Dec. 26, 1957, Ser. No. 705,341
5 Claims. (Cl. 307—88.5)

The present invention is directed toward a semiconductor protective circuit and more particularly toward a circuit for protecting transistors operated in a common emitter type circuit configuration.

In transistor circuits operated in common or grounded emitter configurations, the loss of supply or control voltages to any of the transistor elements may result in damage to the transistor. This is particularly undesirable in applications wherein a large number of transistors are connected in a common circuit arrangement, such as in high speed computing circuits, where the loss of a single transistor may result in the destruction of additional transistors in the common circuit. The subject invention is directed toward a circuit for protecting transistors against damage arising from failure or removal of the control voltages.

Basically, the present invention comprises a voltage divider network connected between the base bias supply potential and the collector supply potential and an asymmetric device connected between the base of the transistor and a point on this voltage divider network. The output at the collector includes a clipping diode and its associated supply potential for controlling one level of the output signal while simultaneously limiting the reverse collector voltage developed across the transistor. The present invention protects the transistor against damage resulting from failure of the base bias supply potential or the output control potential. In the first condition, the asymmetric device, normally back biased, will conduct and drive the transistor into saturation, thereby raising the output signal to ground level. In the latter event, the voltage divider network will limit the reverse collector potential to a safe value. Provision is also made for the loss of both supply potentials.

Accordingly, a primary object of the present invention is to provide a semiconductor protection circuit.

A further object of the present invention is to provide a simple and inexpensive transistor protective circuit adapted to prevent damage to the transistor in the event of failure of any of the control voltages.

Still another object of the present invention is to provide a circuit for preventing damage to a transistor operated in a common emitter configuration in the event of failure of any of the supply voltages.

Other objects of the invention will be pointed out in the following description and claims and illustrated in the accompanying drawings which disclose, by way of example, the principles of the invention and the best mode, which has been contemplated of applying that principle.

The drawing illustrates in schematic form a preferred embodiment of the subject invention.

Before proceeding with a detailed description of the present invention, a brief description of the operation of transistor circuits of the type used to illustrate the subject invention will be provided. When an input signal is injected between the base and emitter and the output is taken between collector and emitter of a transistor, the common element between the input and output circuits is the emitter. This type of transistor circuit operation is known in the art as common or grounded emitter operation, irrespective of the actual potential on the emitter, and the terms common or grounded are used interchangeably in the ensuing description. A grounded emitter circuit provides both voltage and current gain between the input and output circuits, and function as an inverter with respect to the polarity of the input signal. The preferred embodiment herein described to illustrate the present invention is an inverter circuit which may be operated as a power amplifier or utilized in high speed switching circuitry.

Transistors are affected by emitter to collector voltages in much the same way as diodes are affected by reverse voltages, and junction type transistors used for high or moderately high speed switching circuits have a nominal emitter to collector breakdown potential range of approximately 10–20 volts. The present invention functions to prevent such breakdown in the event that certain of the supply voltages are removed.

Referring now to the drawing, there is shown in schematic form a high speed inverter circuit utilizing a PNP type transistor 21 connected in a grounded emitter circuit configuration. Transistor 21 has a base 23, a collector 25 and an emitter 27. The input signal is applied through input terminal 29 and parallel connected resistor 31 and capacitor 33 to the base 23 of transistor 21. In the preferred embodiment, the input signal varies between nominal levels of ground and −10 volts. Resistor 31 is the bias resistor associated with the base of transistor 21, while capacitor 33 is an overdrive capacitor which increases the operating speed of the circuit by overdriving the base in either direction in response to the input signal. During normal circuit operation, transistor 21 will be either On or Off, depending on the level of the input signal. In a PNP type circuit such as herein described, a negative signal or level applied to the base turns the transistor On, while a positive signal or level turns the transistor Off. The level of the output signal is opposite to that of the input due to the inverter operation.

Assuming that the above noted lower level input signal is applied to the transistor base, the transistor is turned On, resulting in current from the emitter to collector through the collector load resistor 35, whereby the potential at collector 25 rises to approximately ground level. This produces saturation in the transistor and the transistor acts as a short circuit to the input signal, since only a nominal voltage appears across the emitter to collector terminals and the collector is stabilized at approximately ground level. Since the output terminal 40 is connected to the collector through conductor 39 and terminal 41, a corresponding potential level of approximately ground appears at the output terminal.

Under the condition where a positive transition signal or level is applied to input terminal 29, the base of the transistor becomes slightly negative with respect to the emitter due to the drop across bias resistor 31, thereby turning the transistor Off. Current flows from the base bias supply terminal 43 through resistor 47 to junction 49, where it divides, some flowing into the input source, some attempting to flow from the base to collector. The current flow from base to collector is the leakage current generally designated Ico. The function of resistor 47 is to permit Ico to flow while maintaining the base connection positive with respect to the emitter, the condition necessary to maintain cutoff. When the transistor is turned Off, the output at terminal 40 tends to fall to the −30 volt level, but is clipped at a level of −10 volts by clipping diode 51 and its associated potential source 53.

Thus normal circuit operation is not affected by the transistor protective circuit comprising diode 55 and resistors 57, 59. The transistor protective circuit functions to protect the transistor against the loss of the supply potentials of −10 and +20 volts irrespective of whether the transistor is On or Off when the loss occurs.

No protection is required against the loss of the −10 volt supply with the transistor On, since the transistor is in saturation and its output is at approximately ground level. Without the transistor protective circuit, the loss of the −10 volt supply at terminal 53 with the transistor Off would cause the potential at collector 25 to drop to the −30 volt level of supply terminal 61. Since the emitter 27 is connected to ground, the 30 volt potential across the transistor would exceed the reverse collector voltage limitation of the transistor, which, as heretofore designated, is in a nominal range of 10–20 volts.

In the event that the −10 volt supply is lost with the transistor Off, current flow from +20 volt supply 43 through the voltage divider comprising resistors 57, 59, diode 51 and resistor 35 to the −30 volt supply terminal 61, will maintain the voltage at junction 41, connected to collector 25, at a maximum level of −10 volts. The inverter circuit could still operate, but its maximum speed capability would be reduced.

It will be noted from the drawing that diode 55 is normally reverse biased, since its anode is connected to base 23 of transistor 21 and its cathode connected through resistor 57 to +20 volt supply 43. With the failure of the +20 volt supply, however, diode 55 becomes forward biased and starts to conduct current from the base 23 of transistor 25, thereby turning the transistor On and putting it in saturation, resulting in an output signal at approximately ground level. The inverter circuit under this condition will fail to operate, but the transistor will not be damaged. Thus, failure of the +20 volt supply potential will cause transistor 21 to be driven into saturation if it was Off or maintain it in saturation if it was On at the time of failure.

In the event that both supply potentials of +20 and −10 volts are lost simultaneously, current will flow from the input source through diode 55, resistor 59, diode 51 and resistor 35 to −30 volt supply terminal 61. This will raise the collector potential up to about 0.6 volt, which represents a safe operating condition well within the power dissipation capabilities of the transistor.

Another advantage of the present invention is that the turn-on delay, i.e., the time interval required for electrons leaving the emitter to arrive at the collector, is minimized by the action of diode 55 in preventing excessive positive bias being developed on base 23 of transistor 21.

To utilize the invention in any grounded emitter circuit, the only critical components are resistors 57 and 59, which will vary in accordance with power requirements and specifications of the particular circuit. However, the circuit must be so designed that the voltage drop across them will not exceed the collector breakdown potential and also such that the current drawn through resistor 59 to the −10 volt supply terminal 53 is sufficient to saturate the transistor. Circuits values utilized in the preferred embodiment are tabulated below to illustrate one operative arrangement of the present invention.

| | |
|---|---|
| Resistor 31 | 10K |
| Capacitor 33 | 33 μμf. |
| Resistor 35 | 3K |
| Resistor 47 | 56K |
| Resistor 57 | 2.2K |
| Resistor 59 | 1.6K |
| Diode 51 | Crystal |
| Diode 55 | Crystal |

While the subject invention is limited to junction type transistors operating in a grounded emitter configuration and has been described with reference to a PNP type transistors, it can be adapted to NPN type transistors merely by the changing of the bias potentials as designated below, since PNP and NPN transistors are essentially complements of each other. To modify the invention for an NPN type transistor, the polarity of diodes 51 and 55 would be reversed, the +20 and −30 volt potentials reversed and the −10 volt and ground potentials reversed. Similarly, the subject invention has been shown in a single circuit arrangement, but it may be employed for a plurality of similar circuit by interconnecting a separate diode from terminal 56 on the voltage divider network to the base of each transistor in the manner shown in the figure. In this manner, protection against supply voltage failures may be provided at a very nominal cost. While the invention has been illustrated and described with reference to an inverter circuit, it is also applicable to any transistor circuit operated in a grounded emitter configuration.

While there has been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims:

What is claimed is:

1. A switching transistor of the junction type operating in the common emitter type circuit configuration comprising in combination means including a first power source and a load resistor for providing current flow from emitter to collector, means for introducing input signals to the base of said transistor, biasing means comprising a second power source having a polarity opposite said first source and a resistor connected in series to the base of said transistor, and having a magnitude capable of being overcome by said input signal means, a voltage divider network comprising at least two series connected impedance members between the collector of said transistor and said second power source and an asymmetric impedance member connected in forward direction between the base of said transistor and an intermediate point in said voltage divider network.

2. A protective circuit for controlling the reverse collector potential of a junction type transistor operated in a common emitter circuit configuration upon loss of control voltages comprising in combination a transistor having base, emitter and collector elements, a first control voltage connected to said collector for controlling the output potential of said circuit during its non-conducting state, bias means including a second control voltage connected to said base of said transistor, a voltage divider network comprising at least two impedance members connected between said first and second control voltages and an asymmetric device connected between the base of said transistor and a point on said voltage divider network and polarized to conduct current upon loss of said second control voltage.

3. A protective circuit for preventing excessive reverse collector voltage being developed across a junction type transistor operated in a common emitter circuit configuration comprising in combination biasing means including a first power supply and a resistor connected to the base of said transistor, a second power supply and a resistor connected to the collector of said transistor, means including a third power supply for controlling the amplitude of the output signal from said collector, a voltage divider network connected between said first and second power supplies, said third power supply being connected to a first point on said voltage divider network and an asymmetric device connected between said base of said transistor and a second point on said voltage divider network.

4. A circuit for protecting a junction type transistor operated in a common emitter circuit configuration against damage arising from the loss of supply potentials comprising in combination a transistor having base, collector and emitter elements, a first supply potential and a load impedance connected to said base of said transistor, means including a second supply potential connected to said collector element for controlling the amplitude of the output signal from said collector of said transistor, means for initiating conduction from emitter to collector of said transistor by applying a negative signal to said base of said transistor, a voltage divider network connected between said first and second supply potentials and an asymmetric device connected in a forward direction between said first supply potential and said base of said transistor.

5. A protection circuit for protecting a transistor operating in a grounded emitter configuration in the event of supply potential failure comprising at least one transistor having at least emitter, base and collector connections, means for applying an input signal to said base connection to control current flow from emitter to collector in said transistor in accordance with the magnitude of said input signal, biasing means comprising a first supply voltage and an impedance connected in series to said base connection of said transistor, a second supply voltage and an impedance connected in series to said collector connection of said transistor, a first asymmetric device and a third supply voltage connected to the collector and output terminal of said transistor for controlling one level of the output signal developed by said circuit in response to each of said input signals, a voltage divider network including a pair of impedance elements and said first asymmetric device connected between said first and second voltage supplies, said output terminal being connected to a point on said voltage divider network and a second asymmetric device connected in a forward direction between the base of said transistor and a junction point between said pair of impedance elements.

References Cited in the file of this patent

UNITED STATES PATENTS

| | | |
|---|---|---|
| 2,814,736 | Hamilton | Nov. 26, 1957 |
| 2,832,900 | Ford | Apr. 29, 1958 |
| 2,884,545 | Houck | Apr. 28, 1959 |